United States Patent Office.

ARTHUR WADGYMAR, OF ST. LOUIS, MISSOURI, ASSIGNOR TO HIMSELF, BYRON SLOPER, AND W. C. GOULD.

*Letters Patent No. 70,655, dated November 5, 1867.*

IMPROVED PROCESS OF PRESERVING EGGS.

*The Schedule referred to in these Letters Patent and making part of the same.*

TO ALL WHOM IT MAY CONCERN:

Be it known that I, ARTHUR WADGYMAR, of the city and county of St. Louis, State of Missouri, have invented a new and useful Improved Egg-Preserving Process, of which the following is a full, clear, and exact description.

The nature of my invention consists in immersing the egg in such a combination of chemicals as will effectually destroy the animal life of the same without in any manner affecting the quality of the egg as an article of food. It also preserves the albumen in its original state, by preventing it from becoming thin from any cause. By it the membrane next the shell is toughened and thickened, thus giving additional support to the shell, which, being itself likewise thickened, effectually excludes all air.

The method of accomplishing this is as follows: Take ten (10) pounds of lime, and slake and dissolve it in one hundred and fifty (150) pounds of water, specific gravity 1.030. Pour this on the eggs, and let them stand in it from six to twelve hours. This will open the pores and prepare them for the remaining process. Then take one hundred and fifty (150) pounds of water, and dissolve in it seven (7) pounds of common salt, four (4) ounces of glycerine, one (1) drachm of nitric acid, two (2) drachms of oxalic acid, one-half ($\frac{1}{2}$) drachm of boracic acid, three (3) ounces of carbonate of soda, three (3) ounces of carbonate of potash, the whole compound being of the specific gravity of 1.330. Let the solution stand until thoroughly settled, and then pour it into the vessel containing the eggs and the first-described preparation, and let the whole stand from two to ten days, according to the freshness of the eggs, the lesser time being sufficient, when the eggs are perfectly fresh, to produce the desired result.

The union of the glycerine and oxalic acid destroys the animal life of the egg, the boracic acid toughens the membrane next the shell, the union of the oxalic acid with the carbonate of lime forms an insoluble precipitate, which closes the pores of the shell, effectually excluding the air, while they all unite in preserving the freshness and sweetness of the egg.

I do not intend to limit myself to the specific substances named, but claim them or their equivalents.

What I claim as my invention, and desire to secure by Letters Patent, is—

1. The process of killing the animal life of the egg by the use of the substances above described or their equivalents.

2. The process of toughening the membrane next the shell of the egg by the use of the substances above specified or their equivalents.

3. The process of closing the pores of the egg-shell by the use of the substances above specified or their equivalents.

4. The process of preserving eggs, by the combination of the above-named substances or their equivalents, when used substantially in the manner set forth.

ARTHUR WADGYMAR.

Witnesses:
SAM'L S. BOYD,
HENRY T. CARTER.